(12) United States Patent
Matsubara et al.

(10) Patent No.: US 6,424,476 B1
(45) Date of Patent: Jul. 23, 2002

(54) METHOD AND APPARATUS FOR CONTROLLING READ AND WRITE OPERATIONS IN A STORAGE DEVICE

(75) Inventors: Nobuya Matsubara, Fujisawa; Fuminori Sai, Yokohama; Yuzo Nakagawa, Hiratsuka, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/100,496

(22) Filed: Jun. 19, 1998

(30) Foreign Application Priority Data

Jun. 20, 1997 (JP) .............................. 9-164130

(51) Int. Cl.$^7$ ................................. G11B 5/09
(52) U.S. Cl. .......................... 360/46; 360/32
(58) Field of Search ............... 360/46, 67, 68, 360/32, 51, 137; 710/74; 711/100

(56) References Cited

U.S. PATENT DOCUMENTS

| 5,233,482 A | 8/1993 | Galbraith et al. ............. 360/46 |
| 5,321,559 A | 6/1994 | Nguyen et al. ................ 360/46 |
| 5,726,821 A | * 3/1998 | Cloke et al. .................. 360/67 |
| 5,829,011 A | * 10/1998 | Glover ........................ 711/100 |
| 5,918,068 A | * 6/1999 | Shafe .......................... 710/11 |

FOREIGN PATENT DOCUMENTS

| JP | 8-77576 | 3/1996 | ............ G11B/7/09 |
| JP | 08083403 | 3/1996 | ............ G11B/5/09 |
| JP | 8-293176 | 11/1996 | ............ G11B/21/10 |
| JP | 8-315529 | 11/1996 | ............ G11B/21/10 |
| JP | 9-147508 | 6/1997 | ............ G11B/21/10 |

* cited by examiner

Primary Examiner—David Hudspeth
Assistant Examiner—Dan I. Davidson
(74) Attorney, Agent, or Firm—Monica D. Lee; Abdy Raissinia

(57) ABSTRACT

A hard disk drive (HDD) having a control unit that reduces the number of control signals required to control the operation of the channel and amplifier. The HDD includes a control unit for controlling reading or writing data from or to a magnetic head, a preamplifier for amplifying the data from the magnetic head, and a channel module which is controlled by the control unit. The channel module converts digital data signals to data write signals and also converts analog signals from the preamplifier to digital signals. Control information is transmitted to the channel module over the data bus which is used to transmit or receive data read/write signals. The channel module performs control in response to transmitted control information.

14 Claims, 14 Drawing Sheets

COMMAND TIMING ON AN "NRZ" BUS

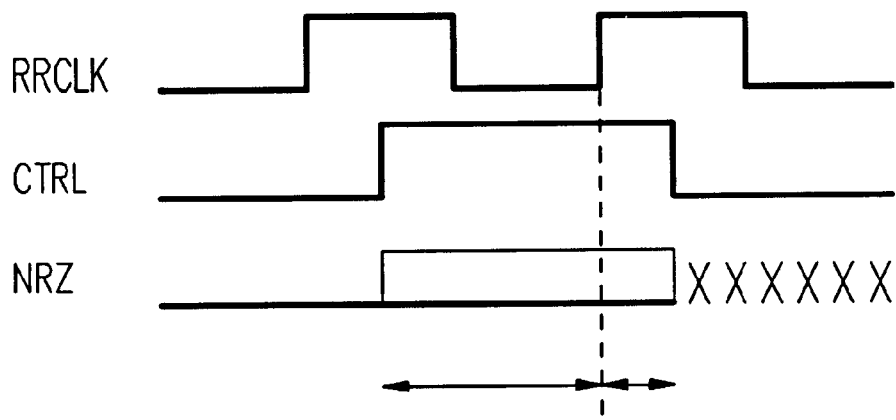

TSETUP : ONSECMIN THOLD : 3.5nsec MAX AT HDC OUT
(THE SAME AS A DATA WRITE OPERATION)

"NRZ" VALUES AND COMMANDS

- 0 : DUMMY COMMAND
- 1 : READ START
- 2 : WRITE START
- 3 : RRCLK STOP OR RESERVED
- 4 : SERVO AREA START
- 5 : SERVO VCO START (OR SERVO RE-CLOCK START)
- 6 : SERVO AGC HOLD
- 7 : SERVO AGC NO HOLD
- 8 : BURST DATA ACQUISITION START
- 9 : BURST DATA TRANSFER START
- A : DATA AREA START
- B : POWER SAVE START
- C : POWER SAVE END
- D : REGISTER WRITE
- E : REGISTER READ
- F : RESERVED

FIG. 4

BURST DATA TRANSMISSION

* IN A 4-BIT MODE, DATA IS TRANSMITTED AT 4 BITS, AND IN A 8-BIT MODE, DATA IS TRANSMITTED AT 8 BITS. HOWEVER, IN A 4-BIT MODE, A RRCLK SIGNAL IS SWITCHED TO A DOUBLE FREQUENCY AFTER THE FIRST BURST DATA ACQUISITION START SIGNAL.

* AFTER ONE CYCLE AFTER A BURST DATA ACQUISITION START SIGNAL (8) OR A BURST DATA TRANSFER START SIGNAL (9), DATA IS TRANSMITTED AT 2-CYCLE INTERVALS IN A 8-BIT MODE AND AT 3-CYCLE INTERVALS IN A 4-BIT MODE AFTER WAITING FOR ONE CYCLE.

* AFTER THE FIRST BURST DATA ACQUISITION START SIGNAL (8), DUMMY DATA MAY ALSO BE OUTPUT.

* IN A 4-BIT MODE, DATA IS TRANSMITTED IN ORDER OF BIT B-8, 7-4, AND 3-0 FROM HIGHER BITS, AND IN A 8-BIT MODE, DATA IS TRANSMITTED WITH LOWER 4 BITS INSERTED NEXT TO HIGHER 8 BITS AND BIT B-4, 3-0 INSERTED TO HIGHER 4 BITS, AND 4 BITS OF DUMMY DATA INSERTED TO LOWER BITS.

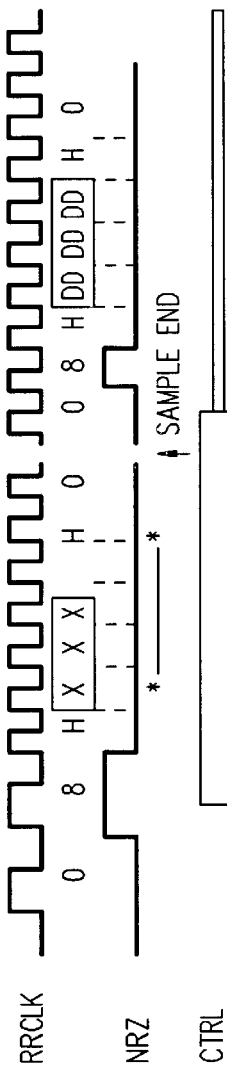

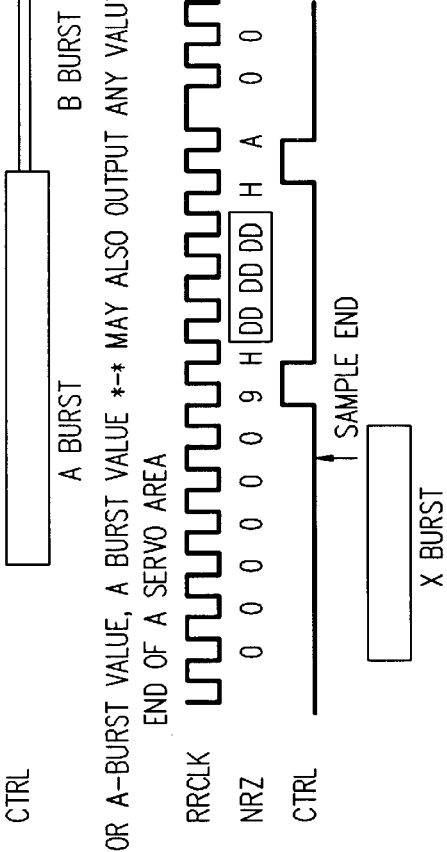

FOR A-BURST VALUE, A BURST VALUE *-* MAY ALSO OUTPUT ANY VALUE OR NEED NOT OUTPUT ANY VALUE.

FIG. 10

TRANSMISSION MUST BE PERFORMED IN CORRESPONDENCE WITH AN ACQUISITION REQUEST (A LIMITATION MUST NOT BE PLACED ON THE NUMBER OF BURST VALUES).

A RRCLK SIGNAL MAY ALSO BE LOW DURING A COMMAND MODE. WHERE A CTRL SIGNAL IS HIGH FOR A CONSTANT PERIOD DURING A COMMAND MODE, THE CHANNEL HAS TO OUTPUT A RRCLK SIGNAL. THE HDC CONFIRMS THAT THE RRCLK SIGNAL HAS COME AND THEN DROPS THE CTRL SIGNAL. DURING THIS OPERATION, THE HDC KEEPS TANSMITTING A VALUE OF 0 TO AN NRZ SIGNAL.

REGISTER ACCESS TIMING

WHEN AN ADDRESS BIT IS WRITTEN, 1-BYTE DATA IS TRANSFERRED IMMEDIATELY AFTER THAT, AND WHEN READING, THE CHANNEL OUTPUTS DATA WITH A SPACE OF ONE CYCLE. IN THE CASE OF A 4-BIT BUS MODE, FOUR BITS OF MSB ARE FIRST TRANSFERRED.

4-BIT BUS MODE WRITE TIMING

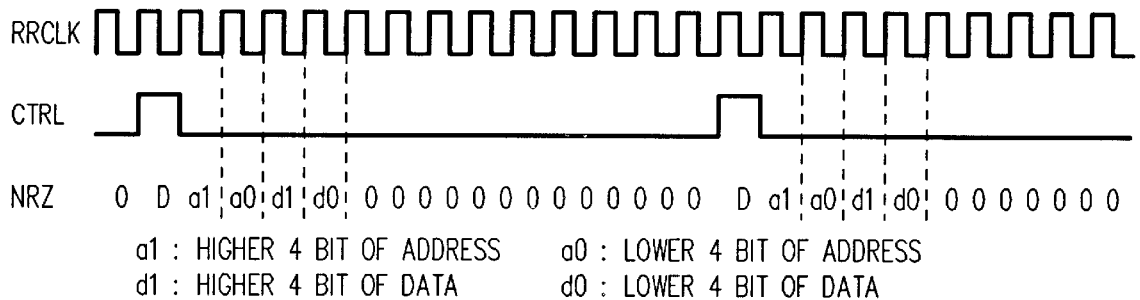

a1 : HIGHER 4 BIT OF ADDRESS    a0 : LOWER 4 BIT OF ADDRESS
d1 : HIGHER 4 BIT OF DATA       d0 : LOWER 4 BIT OF DATA

8-BIT BUS MODE WRITE TIMING

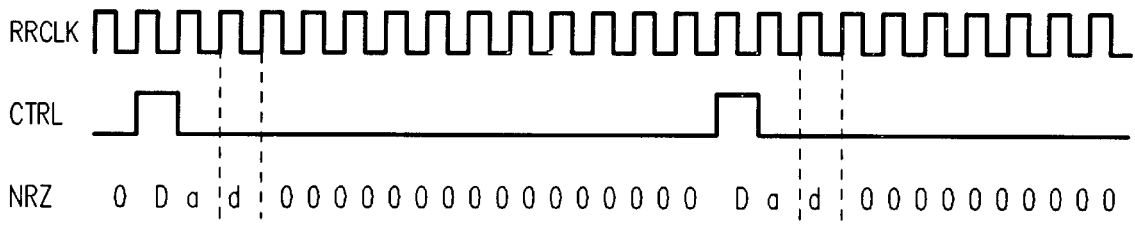

4-BIT BUS MODE READ TIMING

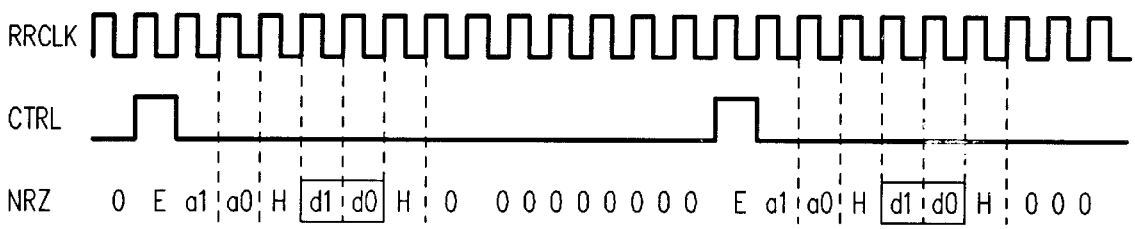

8-BIT BUS MODE READ TIMING

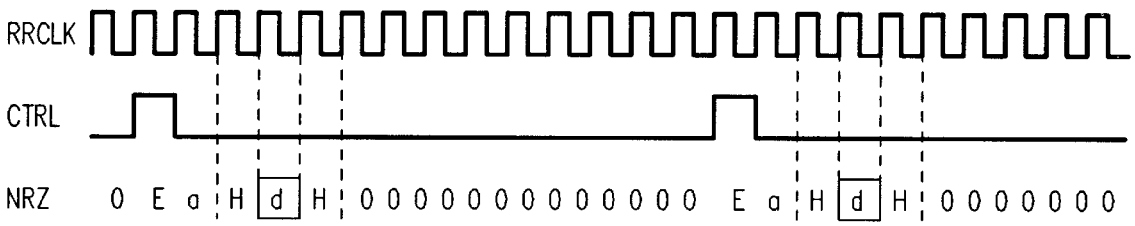

FIG. 12

METHOD AND APPARATUS FOR CONTROLLING READ AND WRITE OPERATIONS IN A STORAGE DEVICE

BACKGROUND OF THE INVENTION

1. Field of the Invention

The present invention relates to a disk drive apparatus for a hard disk drive (HDDs), and more particularly to a disk drive apparatus including a head assembly having a plurality of heads for performing recording/regeneration on a storage medium which is wire mounted on a printed circuit board.

2. Description of Related Art

As the industry demands further miniaturization of hard disk drives (HDDs), which are used to provide external storage for an information processor, there is a need to reduce the number of wires between the head assembly and the printed-circuit board.

A conventional technique of this kind is described, for example, in IBM Technical Disclosure Bulletin, vol. 39, No. 7, July 1996, pp. 175–176.

FIG. 13 is a block diagram illustrating an interface circuit of a conventional HDD 10. The HDD 10 includes a hard disk controller (HDC) 11 for controlling an operation of reading or writing data from or to a magnetic disk, a microprocessing unit (MPU) 12 for controlling the entire operation of HDD 10, a preamplifier 13 for performing reading/writing of data on a magnetic head, and a channel module 14 for controlling preamplifier 13 by various control signals. The HDC 11 and the MPU 12 are referred to as digital systems.

The channel module 14 includes a waveform shaping circuit, a phase-locked loop (PLL) circuit, a frequency synthesizer circuit, and an encoder/decoder. The channel module 14 converts digital data signals from a user to data write signals and also converts analog signals from preamplifier 13 to digital signals.

The channel module 14 is controlled by a read gate control signal, a write gate control signal, a servo gate control signal, a servo data control signal, an in-channel register control signal, and the other control signals. These signals are transmitted over corresponding signal lines connected in parallel. Also, control signals for preamplifier 13, which includes some of the aforementioned control signals, are directly connected and controlled, through noise reduction circuits such as a filter and a buffer by a digital system. In addition, channel module 14 transmits data read/write signals between the digital systems and the channel module over a data bus using a few bits.

The following signals provide input to or output from preamplifier 13 over corresponding signal lines: head select signals HSEL0, HSEL1, and HSEL2; current write signals WCURR0 and WCURR1; a head control signal MRBIAS; a preamplifier-fault write signal AEWFAULT; a preamplifier characteristic control signal TA; a write gate signal WGT; and a power save read/write signal RWPS. The signals WGT and RWPS are input to channel module 14 over corresponding signal lines. Also, the preamplifier 13 and channel module 14 are coupled by data write signal lines WDT+ and WDT− and analog-data read signal lines RDX and RDY.

In addition, MPU 12 and channel module 14 are coupled by a serial register control signal line SENA, a serial clock signal SCLK line, and a serial data signal SDT line.

A data and servo switching signal SRVAREA, an AGC hold signal AGCHOLD, a clear signal CLEAR, a burst detection timing specifying signal BURSTW, a POR reset signal POR, a read gate signal RGT, and a clock signal OSC are transmitted from HDC 11 to channel module 14 over corresponding signal lines. Additionally, a servo data signal SRVDT, a reference clock read signal RRCLK, a serial clock signal SRVSC, and a serial data signal SRVSD are transmitted from the channel module 14 to HDC 11 over corresponding signal lines. User data read/write signals NRZ0, NRZ1, NRZ2, NRZ3 provide bidirectional signals between the HDC 11 and the channel module 14.

However, the interface circuit described above has several drawbacks. For Example, HDC 11 and MPU 12 may not have a sufficient number of pins for all the control signals between HDC 11 and MPU 12. Particularly, as future generations of disk drives increase the number of the signals NRZ0 through NRZ3 (for example, from 4 signals to 8 signals), the number of pins is insufficient.

An additional drawback is that the direct coupling of HDC 11, MPU 12, channel module 14 and preamplifier 13 (which is sensitive to noise) causes a high error rate which requires that filters be inserted or buffers having a common power supply must be interposed.

Furthermore, as data rates increase in HDDS, it is difficult to write data to the disk if the inductance of the head wire is too large at the preamplifier. For this reason, the preamplifier is mounted near the heads, and consequently, the distance between the preamplifier and the channels on a card causes the preamplifier to be influenced by noise. Because there are a great number of control signals, channels cannot be mounted on a flexible cable near to the preamplifier.

SUMMARY OF THE INVENTION

An object of the present invention is to provide a disk drive which is capable of reducing the number of control signals for performing reading and writing operations.

A disk drive apparatus of the present invention including a head, an amplifier, a control unit, and a channel is described. The head is operable to read or write data from or to a storage medium. The amplifier is operable to amplify data for the head. The control unit is operable to control the operation of reading out servo information for reading or writing data from or to the head. The channel is operable to convert a digital data signal to a data write signal and also to convert an analog signal from the amplifier to a digital signal. The channel is controlled by the control unit. The control of the channel by the control unit is performed over a bus which is also used to transmit or receive a data read/write signal.

For one embodiment of the present invention, when the channel is performing data communication, the control information is not transmitted. For an alternative embodiment of the present invention, the control information transmitted over the bus is read out at predetermined bus-cycle intervals in correspondence with requested control. For other embodiments of the present invention, the channel generates a control signal to control the amplifier in response to the control information.

A circuit used in a storage device is also described. The circuit includes an amplifier operable to amplify a data read signal from a storage medium or a data write signal to the storage medium. The circuit also includes a control unit for controlling reading or writing data operations. The channel is coupled to the amplifier via a data signal line. The channel is operable to convert between an analog signal and a digital signal. The control unit controls the operation of reading or writing data from or to the storage medium, by controlling a signal on the data signal line.

Other objects, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which:

FIG. 4 is a timing chart illustrating the command on the NRZ bus and the command timing according to one embodiment of the present invention;

FIG. 10 is a timing chart for explaining the burst data transmission of the aforementioned disk drive apparatus;

FIG. 12 is a timing chart illustrating the register access timing of the aforementioned disk drive apparatus.

DETAILED DESCRIPTION

A disk drive apparatus according to one embodiment of the present invention is suitable for a small HDD where a head assembly having a plurality of heads for performing recording/regeneration on a storage medium is wire mounted to a printed-circuit board.

For one embodiment of the present invention, a signal line controls a channel module which converts a digital data signal to a data write signal and also converts an analog signal from an amplifier to a digital signal, and the signal line is replaced with control information. The control information is transmitted over a bus which transmits or receives a data read/write signal, and channel module performs control, based on the transmitted control information. Therefore, a great number of control signals to an analog system can be minimized and thereby reduce cost. Furthermore, a noise countermeasure can easily be implemented. Moreover, it becomes possible to mount not only a preamplifier but also a channel module on a flexible cable.

Figure 1:
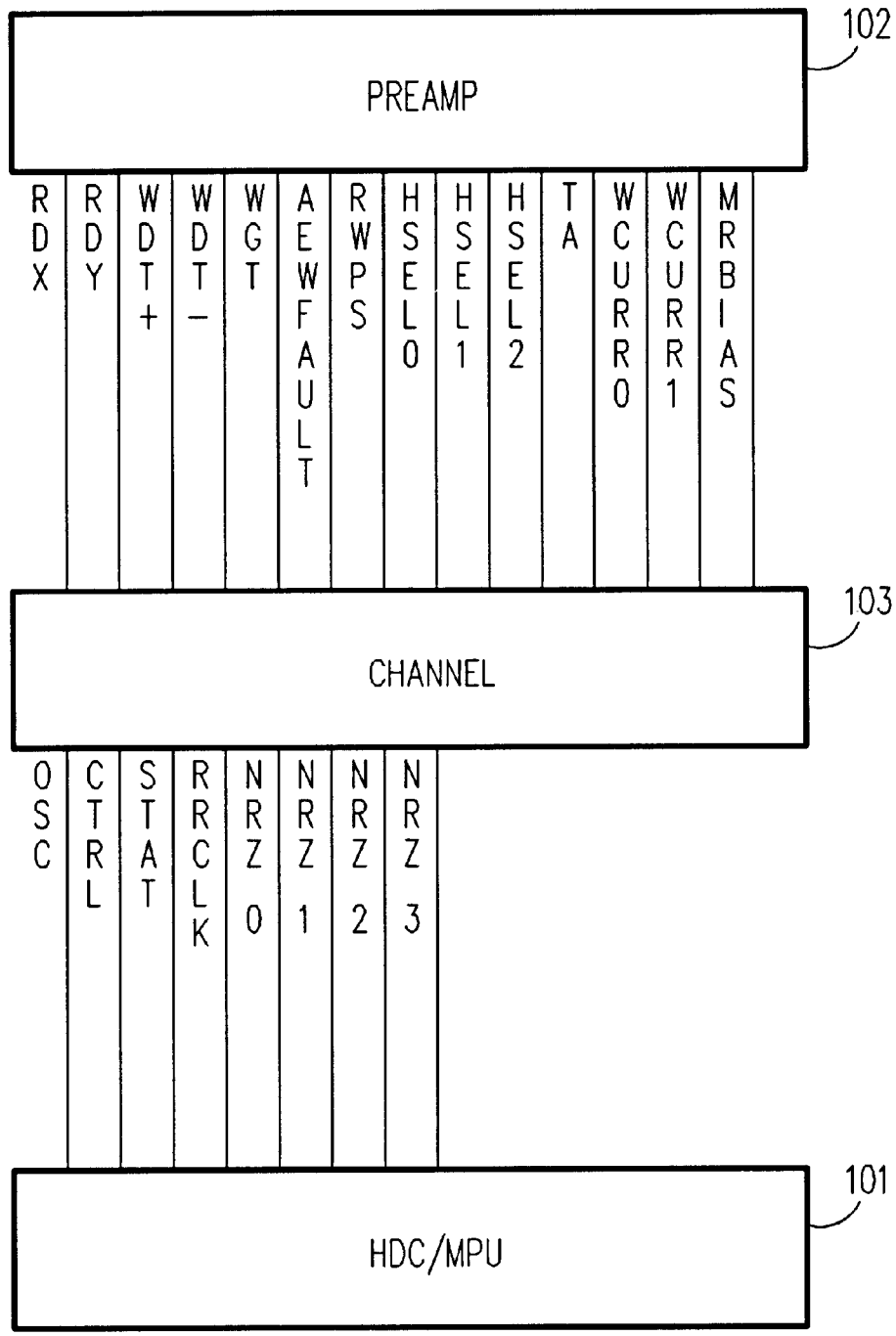
FIG. 1 is a block diagram illustrating disk drive apparatus according to one embodiment of the present invention.

FIG. 1 is a block diagram illustrating a disk drive apparatus according to one embodiment of the present invention. The disk drive apparatus shown in FIG. 1 is suitable for a parallel arm electronics (AE) application.

In FIG. 1 an HDD 100 includes an HDC/MPU (control means) 101 where both an HDC for controlling an operation of reading or writing data from or to a magnetic disk and an MPU for controlling the entire operation of the HDD are integrated as a single digital system and housed within a package. The integrated HDC and MPU is referred to as a controller. Furthermore, HDD 100 includes a preamplifier (amplification means) 102 for performing reading/writing of data on a magnetic head and a channel module (conversion means) 103 for converting between a digital data stream and an analog signal and controlling preamplifier 102.

The channel module 103 may include waveform shaping circuit, a phase-locked loop (PLL) circuit, a frequency synthesizer circuit, an encoder/decoder, etc. The channel module 103 converts a digital user data signal to a data write signal and also converts an analog signal from the preamplifier 102 to a digital signal.

The channel module 103 transmits data read/write signals between the digital system and channel module 103 over a data bus using a few bits. The status of the data bus as indicated by a control signal CTRL provides control information for channel module 103. Also, control signals for preamplifier 102 are directly connected and controlled (theoretically including inversion, through circuits for noise reduction such as a filter and a buffer) by a digital system.

The following signals are transmitted between preamplifier 102 and channel module 103: data write signals WDT+ and WDT−, analog-data read signals RDX and RDY, head select signals HSEL0, HSEL1, and HSEL2, current write signals WCURR0 and WCURR1, a head control signal MRBIAS, a preamplifier-fault write signal AEWFAULT, a preamplifier characteristic control signal TA, a write gate signal WGT, and a power save read/write signal RWPS.

The following signals are transmitted between HDC/MPU 101 and channel module 103: a clock signal OSC, a control signal CTRL, a status signal STAT, a reference clock read signal RRCLK, and user data read/write signals NRZ0, NRZ1, NRZ2, NRZ3. The user data read/write signals NRZ0, NRZ1, NRZ2, NRZ3 function as both a data bus for transmitting and receiving data read/write signals and a bus (called an NRZ bus) for sending control information. This control information includes servo data transfer information. The control signal CTRL, provides the status of the data bus. Also, when channel module 103 is performing data communication through the data bus, this indicates the end of the communication.

That is, the HDC/MPU 101 and the channel module 103 use a limited number of control signals (i.e., control signal CTRL, status signal STAT, and clock signals OSC and RRCLK) over the data bus. It is important to note that various control signals shown in FIG. 13, such as various gate control signals, a servo data control signal, and an interior register control signal, are not required for this embodiment of the present invention.

Figure 13:
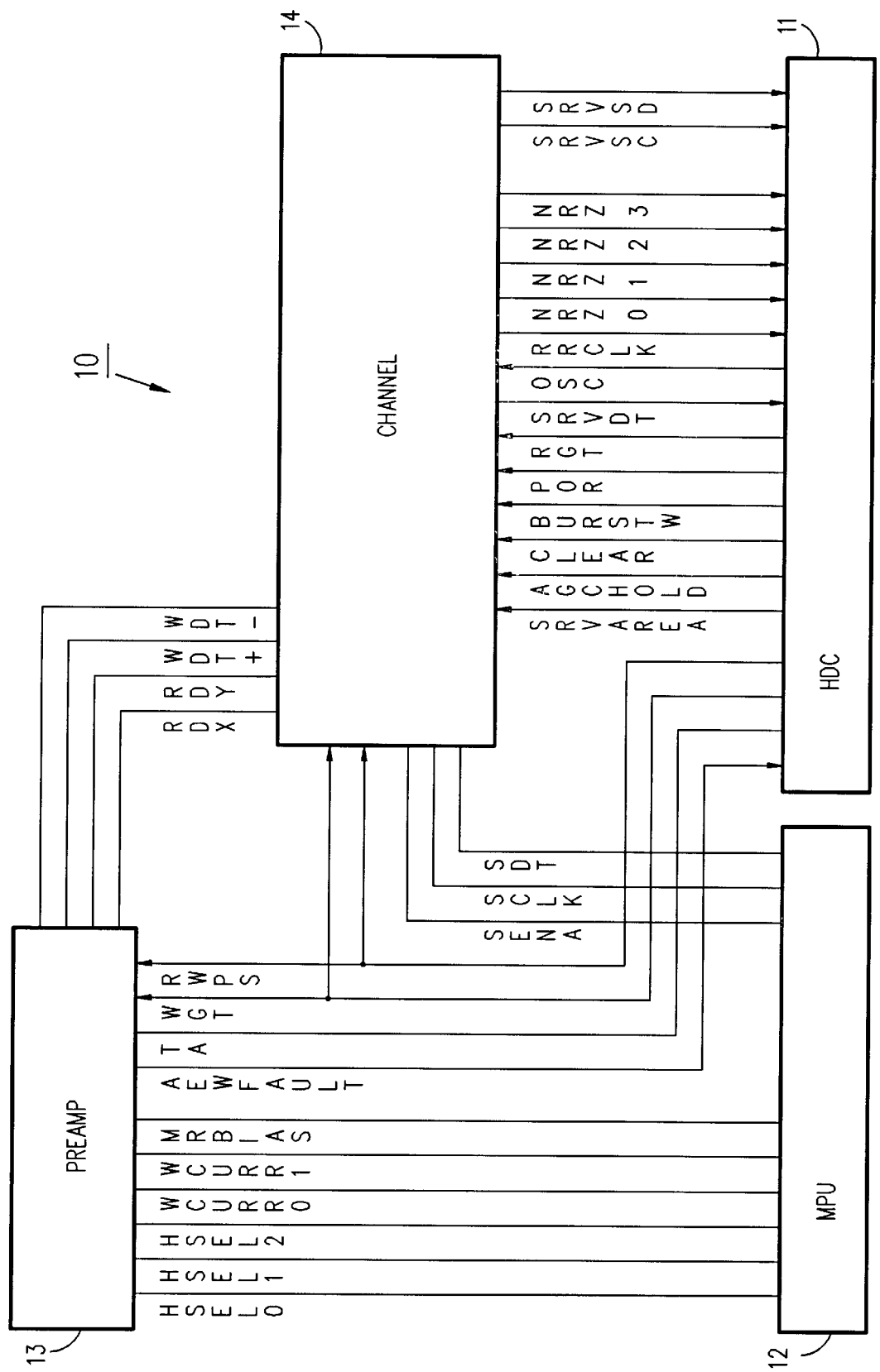
FIG. 13 is a block diagram illustrating a conventional disk drive apparatus.

In comparison with the conventional disk drive apparatus shown in FIG. 13, the serial register control signal SENA, the serial clock signal SCLK, and the serial data signal SDT are omitted between the MPU 12 and the channel module 14. In addition, the data and servo switching signal SRVAREA, the AGC hold signal AGCHOLD, the clear signal CLEAR, the burst detection timing specifying signal BURSTW, the POR reset signal, and the read gate control signal RGT, which are signals' that are output from the HDC 11 to the channel module 14, are omitted. Furthermore, the servo data signal SRVDT, the serial clock signal SRVSC, and the serial data signal SRVSD, which are signals that are output from the channel module 14 to the HDC 11, are entirely omitted. Thus, the number of signal lines and the number of pins between the digital system and the channel module have been reduced by approximately half. Note that the status signal STAT is similar to the servo data signal SRVDT.

Figure 2:
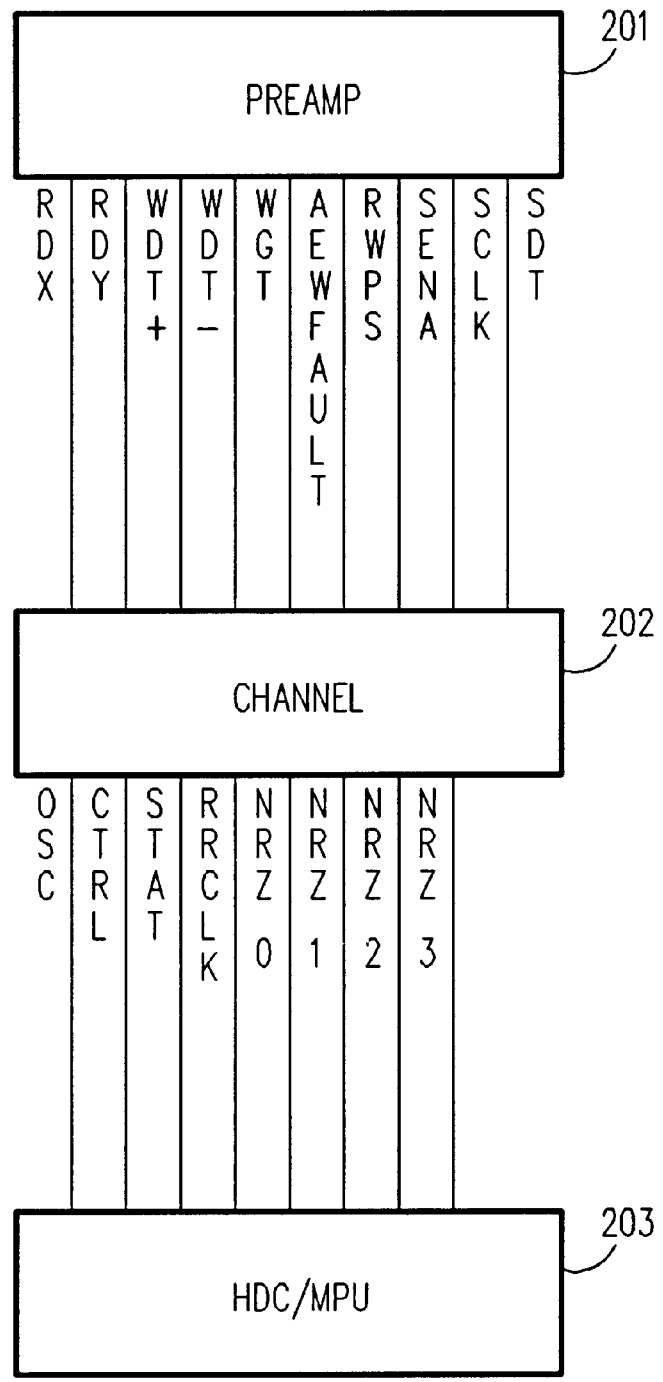
FIG. 2 is a block diagram illustrating a disk drive apparatus according to another embodiment of the present invention.

FIG. 2 is a block diagram illustrating a disk drive apparatus according to another embodiment of the present invention. The disk drive apparatus shown in FIG. 2 is suitable for a serial AE application.

In FIG. 2, an HDD 200 includes an HDC/MPU (control means) 203 where both a hard disk controller (HDC) for controlling an operation of reading or writing data from or to a magnetic disk and a MPU for controlling the entire operation of the HDD are integrated into a single digital system and housed within a package. The integrated HDC and MPU is referred to as a controller. Furthermore, HDD 200 may include a preamplifier 201 for performing reading/writing of data on a magnetic head and a channel module 202 for converting between a digital data stream and an analog signal and controlling preamplifier 201.

The channel module 202 transmits data read/write signals between the digital system and channel module 202 over a data bus using a few bits. The status of the data bus as indicated by a control signal CTRL provides control information for channel module 202.

The following signals are transmitted between preamplifier 201 and channel module 202: data write signals WDT+ and WDT-, analog-data read signals RDX and RDY, a preamplifier-fault write signal AEWFAULT, a write gate signal WGT, a power save read/write signal RWPS, a serial register control signal SENA, a serial clock signal SCLK, and a serial data signal SDT.

The following signals are transmitted between HDC/MPU 203 and channel module 202: a clock signal OSC, a control signal CTRL, a status signal STAT, a reference clock read signal RRCLK, and user data read/write signals NRZ0, NRZ1, NRZ2, NRZ3. The user data read/write signals NRZ0, NRZ1, NRZ2, NRZ3 have both a function as a data bus for transmitting and receiving a data read/write signal and a function as a bus (NRZ bus) for sending control information. The control signal CTRL provides status of the data bus. Also, when channel module 202 is performing data communication through the data bus, this indicates an end of communication.

That is, HDC/MPU 203 and channel module 202 use a limited number control signals (i.e., control signal CTRL, status signal STAT, and clock signals OSC and RRCLK) over the data bus. It is important to note that various control signals shown in FIG. 13, such as various gate control signals, a servo data control signal, and an interior register control signal, are not required.

Referring to FIG. 13, several control signals provide timing information from the HDC and the MPU to the channel module, and furthermore, when reading or writing is being performed by the user data read/write signals NRZ0 through NRZ3, these control signals are not transmitted. That is, control information can be transmitted over the same signal lines used to transmit the user data read/write signals NRZ0 through NRZ3.

The present invention reduces the number of control signals by performing control of the channel module and the preamplifier through the bus which transmits or receives data read/write signals. In addition, a signal for controlling the preamplifier's sensitivity to noise is generated in the channel module by controlling the aforementioned bus, such that the noise influence is removed by connecting the generated control signal from the digital system (i.e., HDC and MPU) directly to the preamplifier.

Now, the operation of the disk drive apparatus is described below in detail. Because HDD 100 and HDD 200 operate in substantially the same manner, the following description of HDD 100 also applies to HDD 200.

A control signal CTRL is provided between HDC/MPU 101 and channel module 103, and the status of the data bus is determined by this control signal CTRL. Also, when channel module 103 is performing data communication through the data bus, this indicates an end of communication.

The read, write, and servo control signals, which requires precise timing, may be accessed during a short cycle (for example, one cycle for a 4-bit bus or more), and the control of a register or the control of a preamplifier which can take a long time may be assessed during a long cycle. A control signal to the preamplifier 102 which requires precise timing, such as a write gate control signal, is also generated by channel module 103, in response control information transmitted to channel module 103 through a data bus. In addition to this, when errors during read and write operations are detected, a predetermined status signal STAT is output from channel module 103 to a digital system (i.e., HDC/MPU 101).

The control signal of preamplifier 102 is generated by channel module 103 in response to the control signal received by channel module 103. Also, the preamplifier has a serial interface.

Figure 3:
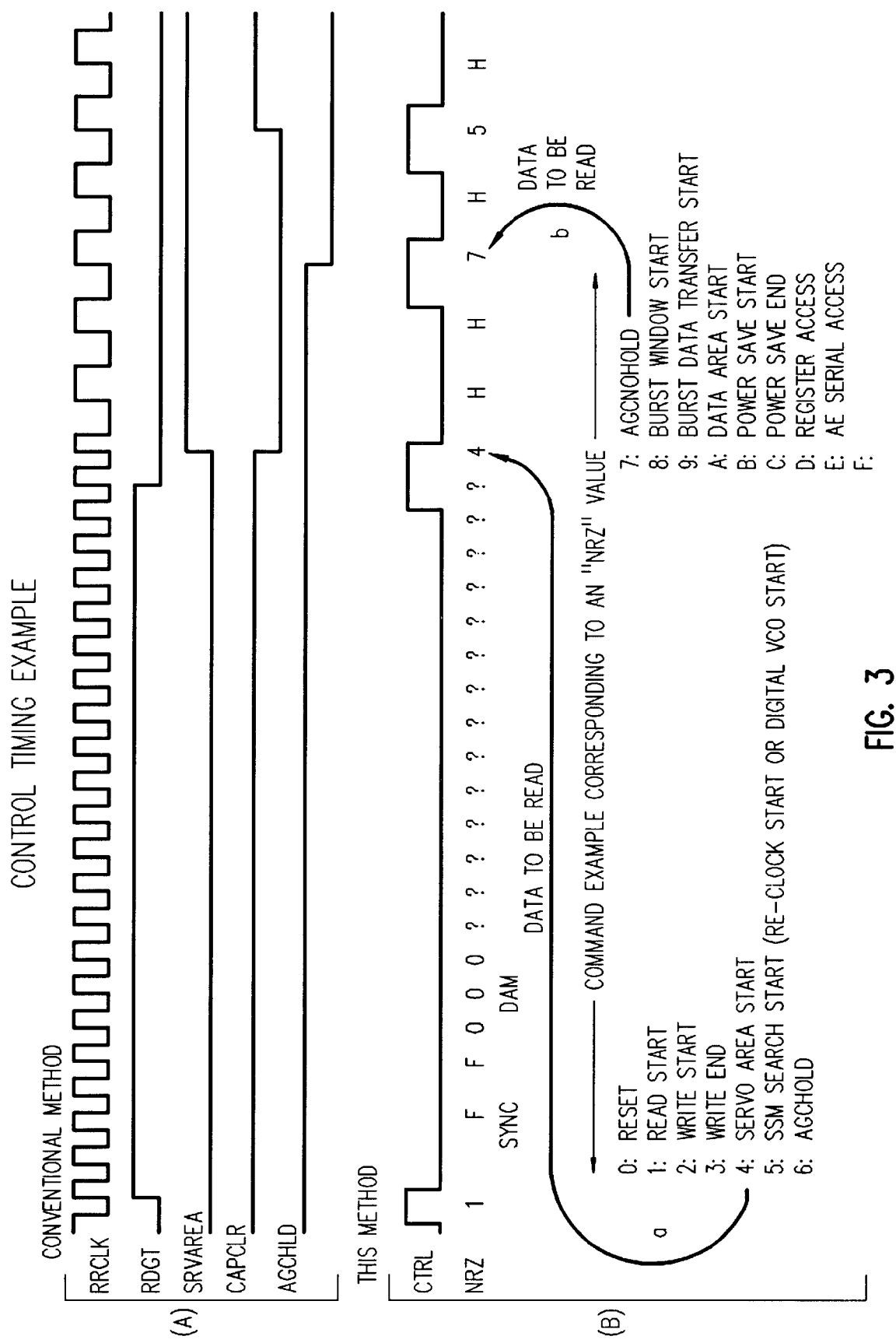
FIG. 3 is a timing chart illustrating a control timing example of the aforementioned disk drive apparatus.

FIGS. 3A and 3B are timing charts showing a control timing example. More specifically, FIG. 3A shows the timing for a conventional disk drive apparatus, and FIG. 3B shows the timing for a disk drive apparatus according to one embodiment of the present invention. For the conventional disk drive apparatus shown in FIG. 13, channel module and the digital system are controlled by a read gate control signal, a write gate control signal, a servo gate control signal, a servo data control signal, an in-channel register control signal, and the other control signals which are connected in parallel. FIG. 3A illustrates the timing for these control signals.

On the other hand, as shown in FIG. 3B, a control signal to the channel module is provided by the values on buses NRZ0 through NRZ3 when the control signal CTRL is at a high level (CTRL signal is at an active level). Now, the NRZ values (0 through F) that are transmitted by the buses NRZ0 through NRZ3 correspond to the control information shown in FIG. 3B. This allows data to be transmitted over data buses NRZ0 through NRZ3 when the control signal CTRL is at a low level and also causes control information to be transmitted over the same data buses NRZ0 through NRZ3 when the control signal CTRL is at a high level.

For example, at timing shown by (a) in FIG. 3B, control information "4" indicates a servo area start control signal (see "SRVAREA" in FIG. 3A is transmitted, and at timing shown by (b) in FIG. 3B, control information "7" indicates an AGC hold control signal (see "AGCHOLD" in FIG. 3A is transmitted.

In FIG. 3B, when the control signal CTRL is at an active level, the "1" on the NRZ bus refers to the start of a read operation, and the data on the NRZ thereafter represents a data read signal from the channel module. When the control signal CTRL is at the active level again, the read operation is completed. In this embodiment, the control signal CTRL has been provided to indicate whether the data bus is used to provide control information to the channel module 103 or data. Also, although the control signal has been synchronized with the reference read clock RRCLK, alternative embodiments may use another synchronous timing or asynchronous timing.

FIGS. 4 through 12 are timing charts showing examples of the control timing for HDD 100. In the figures, the portion enclosed by a solid line indicates the aforementioned control information.

FIG. 4 is a diagram showing a command on the NRZ bus and the command timing. The relationship between the NRZ value and the command is partially different from that shown in FIG. 3.

Figure 5:
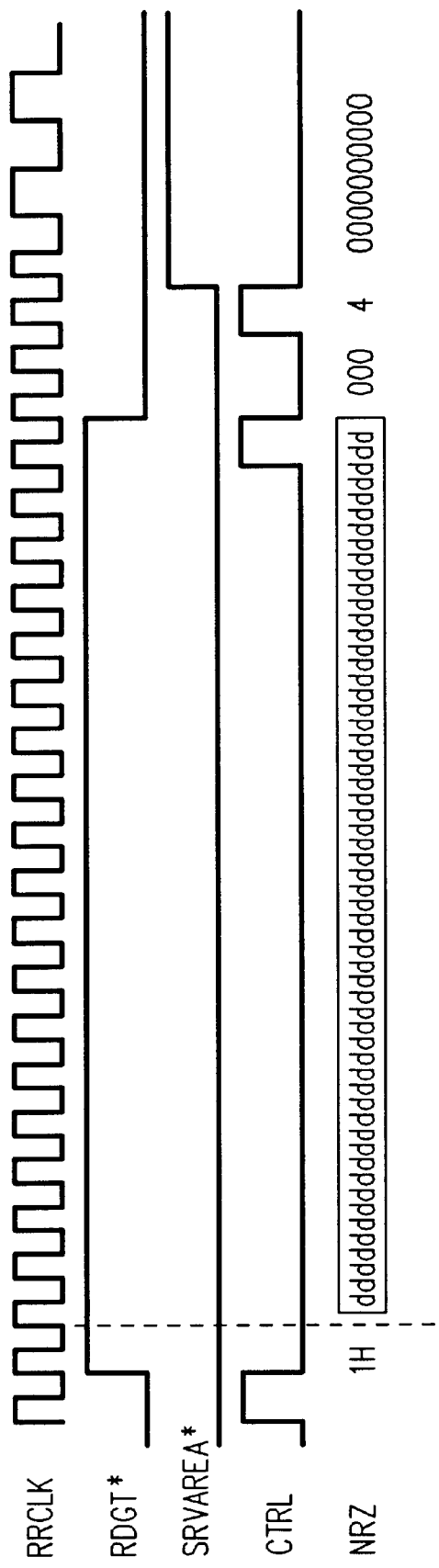
FIG. 5 is a timing chart illustrating a command timing example of the read timing to a servo area in a normal case of the aforementioned disk drive apparatus.
Figure 6:
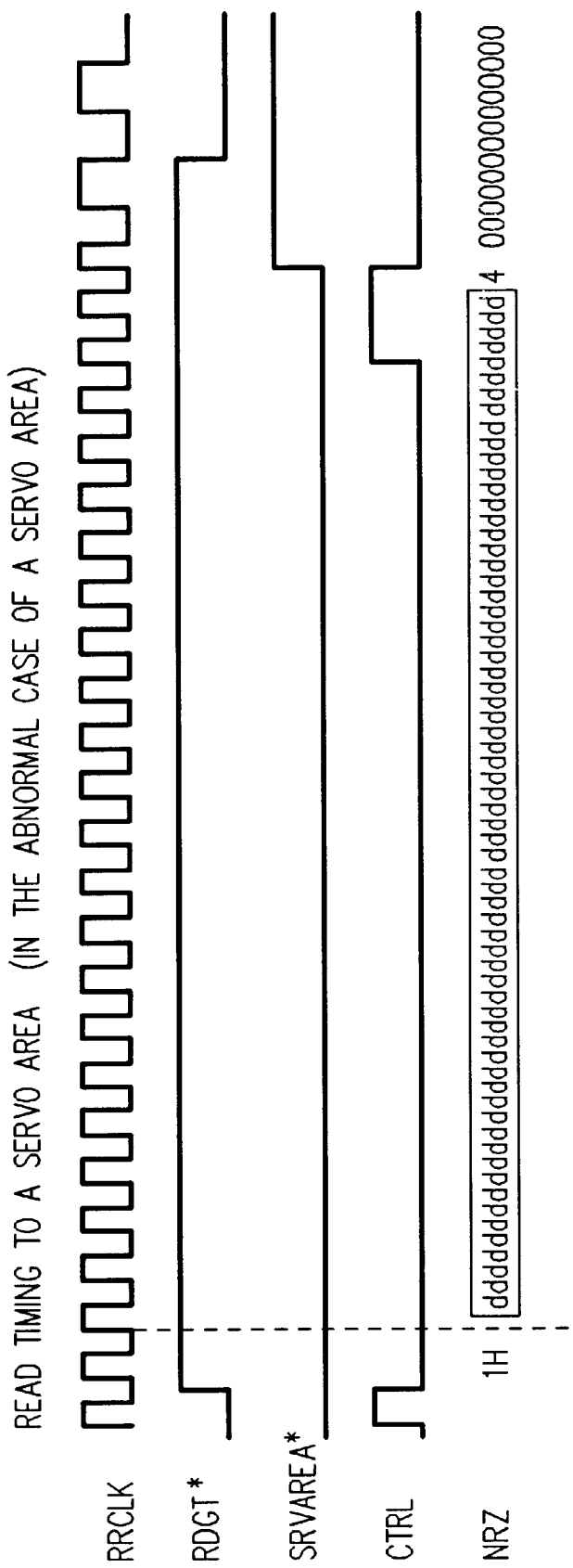
FIG. 6 is a timing chart illustrating a command timing example of the read timing to a servo area in an abnormal case of the aforementioned disk drive apparatus.
Figure 7:
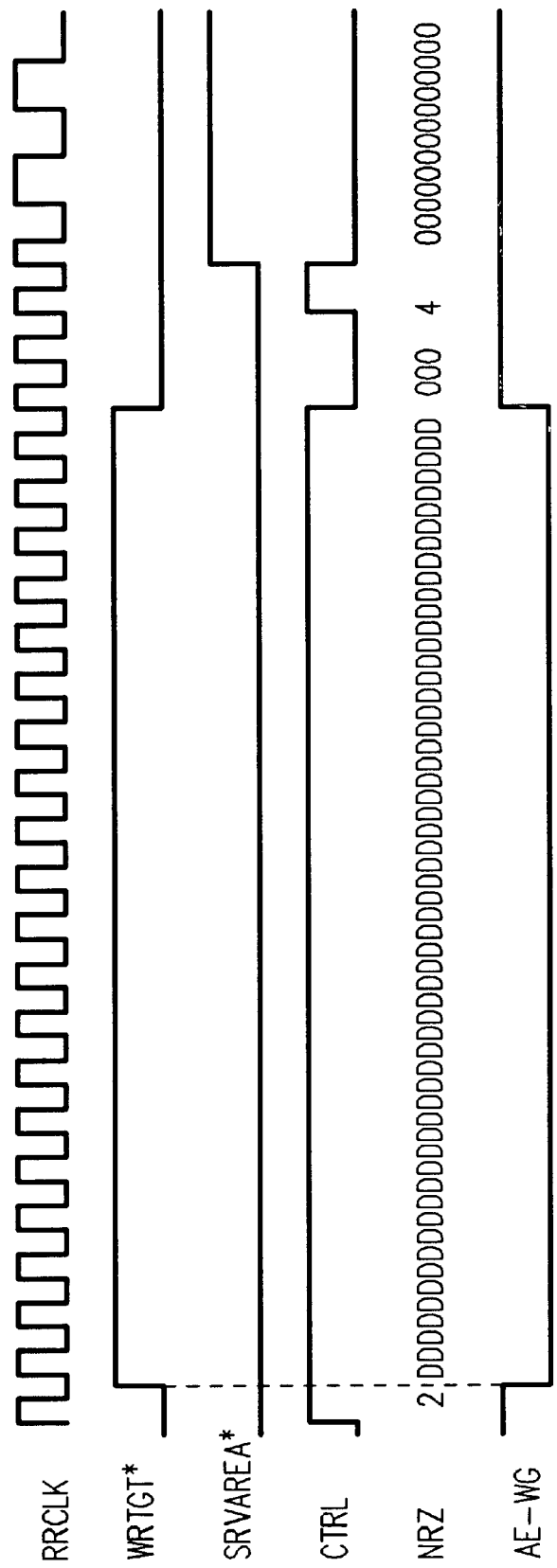
FIG. 7 is a timing chart illustrating a command timing example of the write timing to a servo area in a normal case of the aforementioned disk drive apparatus.
Figure 8:
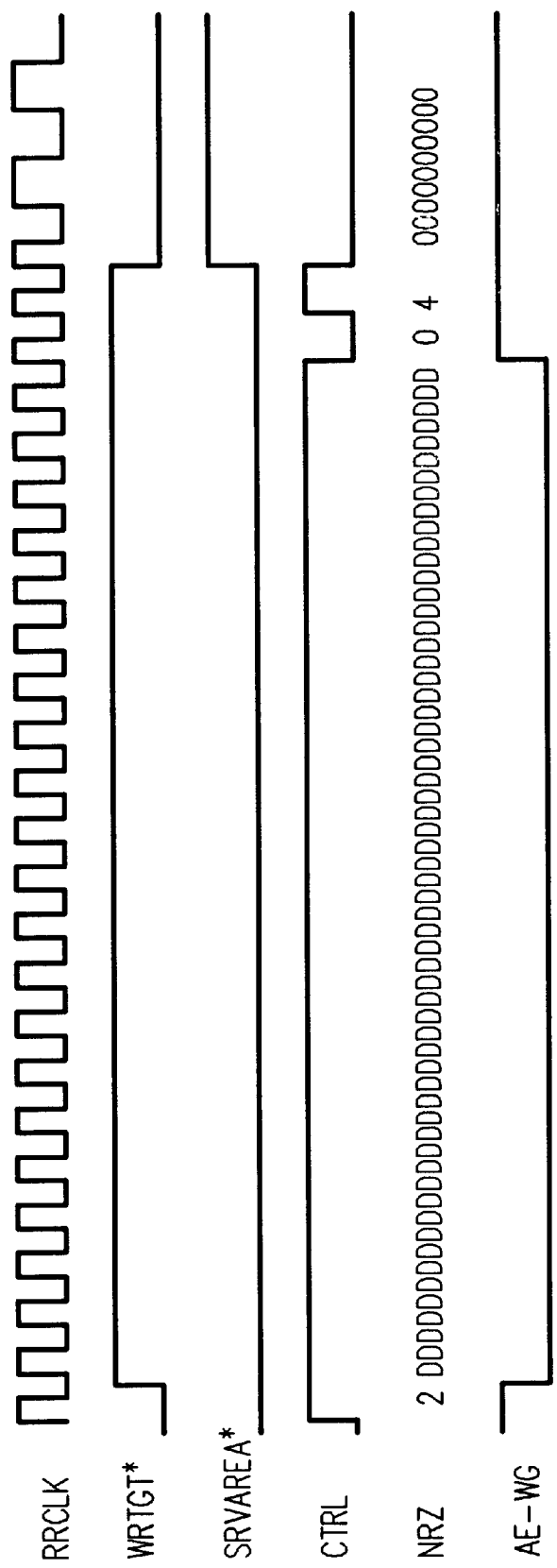
FIG. 8 is a timing chart illustrating a command timing example of the write timing to a servo area in an abnormal case of the aforementioned disk drive apparatus.
Figure 9A:
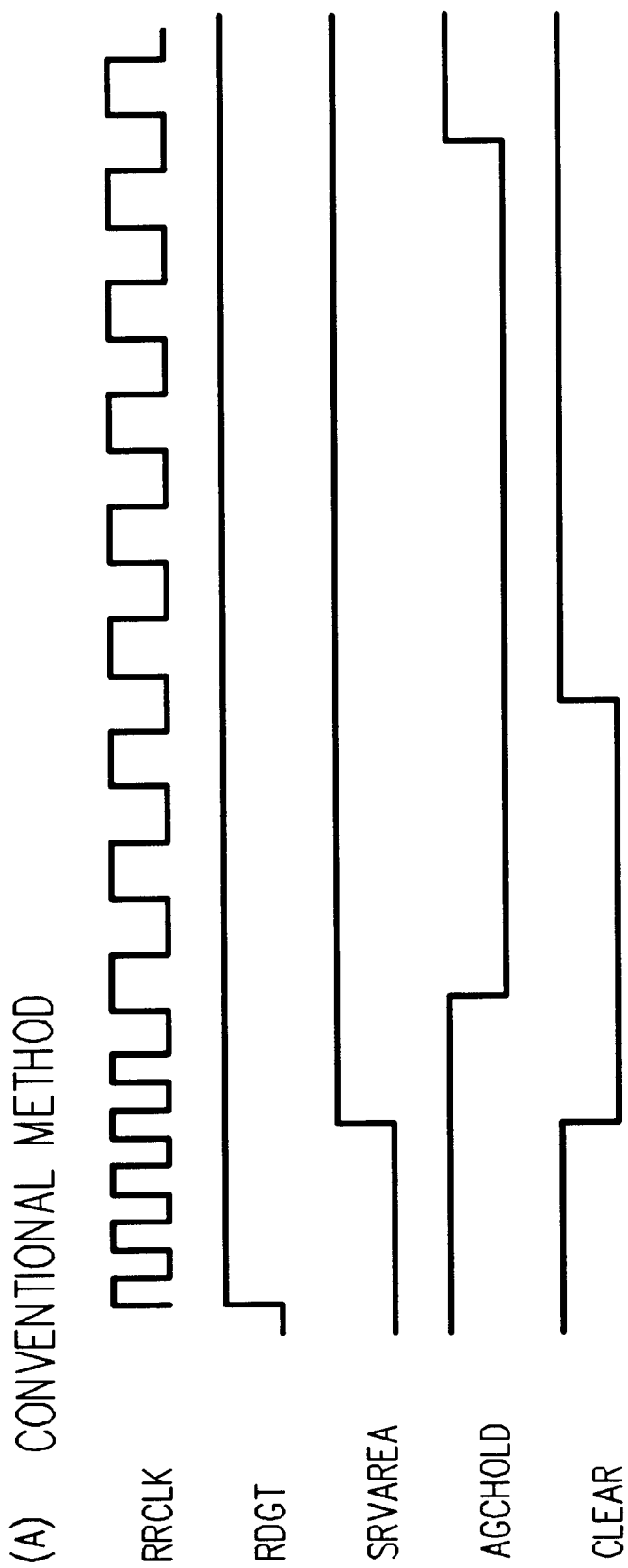
FIG. 9 is a diagram illustrating the servo areas of a conventional method and this method of the aforementioned disk drive apparatus in comparison with each other.
Figure 9B:
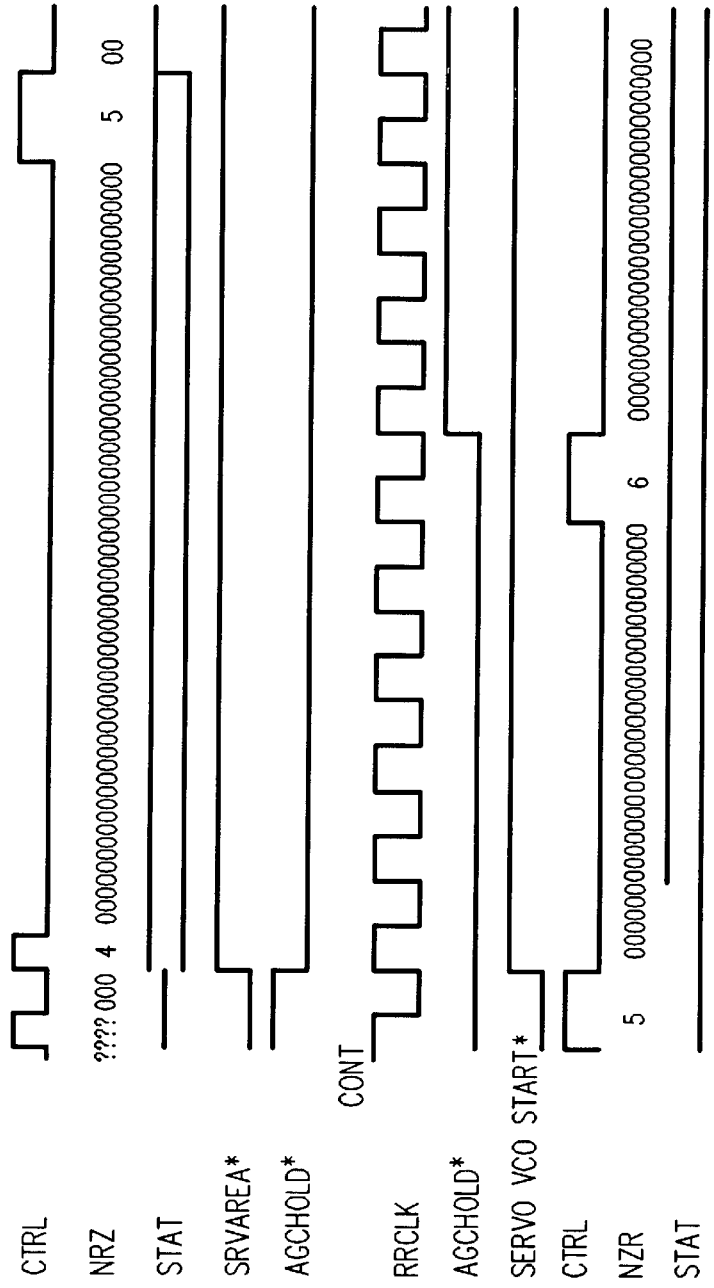

FIGS. 5 through 9 are diagrams showing other command timing examples. FIG. 5 is a diagram showing the read timing to a servo area in a normal case. FIG. 6 is a diagram showing the read timing to a servo area in an abnormal case. FIG. 7 is a diagram showing the write timing to a servo area in a normal case. FIG. 8 is a diagram showing the write timing to a servo area in an abnormal case. FIG. 9 is a diagram showing the conventional method and this method in comparison with each other.

FIG. 10 is a diagram for explaining burst data transmission, and the start of a burst area and the end of a servo area according to the conditions shown.

Figure 11:
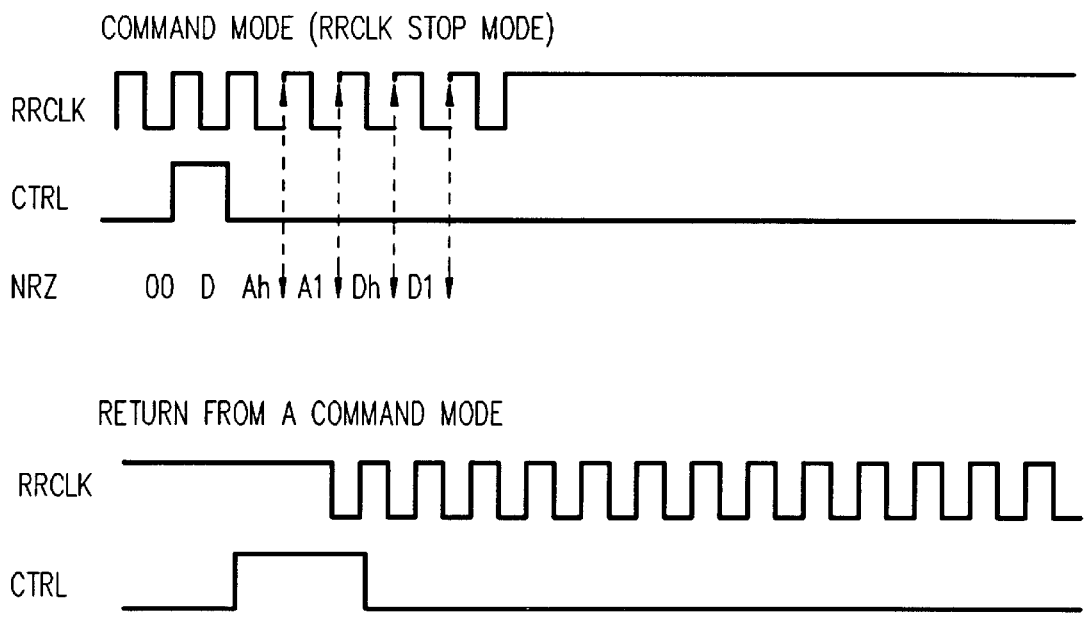
FIG. 11 is a timing chart illustrating the command and the command return of the aforementioned disk drive apparatus.

FIG. 11 is a timing chart showing a command mode (RRCLK stop mode) and the return thereof. The command mode is set so as to satisfy the control conditions shown in FIG. 11.

FIG. 12 is a timing chart showing register access timing, and read and write operations by a 4-bit bus and a 8-bit bus are performed according to conditions shown.

As has been described above, HDD 100 according to this embodiment includes HDC/MPU 101 for controlling an operation of reading or writing data from or to a magnetic head, preamplifier 102 for amplifying the data from the magnetic head, and channel module 103 controlled by HDC/MPU 101. The channel module 103 converts digital data signals to data write signals and also converts analog signals from preamplifier 102 to digital signals. A signal line for controlling channel module 103 is replaced with control information, and the control information is transmitted through the NRZ bus which transmits or receives a data signal for reading or writing. The channel module 103 performs control, based on the transmitted control information. Therefore, the number of control signals can be minimized and thereby reduce cost.

Also, if the control of the preamplifier 102 which is easily influenced by noise is performed through the channel module 103, a noise countermeasure can easily be implemented.

In addition, since the signals which are transmitted between an analog system and a digital system can be considerably reduced and controlled through a flexible cable connector with about 20 pins, it becomes possible to mount not only a preamplifier but also a channel module on a flexible cable.

While various embodiments of the present invention have been described with respect to an HDD, alternative embodiments may be extended to other systems provided it is equipped with control means for controlling an operation of reading or writing data from or to the aforementioned head. For example, the present invention may also be employed in an external storage other than HDDs, such as an magneto-optical disk data storage, and similar advantages as the aforementioned embodiment are obtainable.

Also, in this embodiment, although the NRZ bus has been described to transmit 4-bits or 8-bits of data, it may be extended to other data forms if it transmits control information through a bus which transmits or receives a data signal for reading or writing. In addition, the corresponding relationship between the NRZ value and the command, or the relationship between the bus cycle and the read timing may vary from the examples provided below.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A disk drive controller comprising:
   a bus having at least one signal line;
   a control circuit operable to control read and write operations of a disk drive, said control circuit receiving read data over the at least one signal line when performing said read operation and providing write data over the at least one signal line when performing said write operation, said control circuit provides a control signal having a first state when said read or write operations are being performed, said control circuit provides said control signal having a second state and provides control information over the at least one signal line when said read and write operations are not being performed.

2. The controller of claim 1, wherein said control circuit includes a hard disk controller and a microprocessor unit integrated together and housed within a single package.

3. The controller of claim 1, wherein said control information is used to control a channel module operable to convert a digital write signal to an analog write signal during said write operation and to convert an analog read signal to a digital read signal during said read operation.

4. The controller of claim 3, wherein said control information is used to generate control signals to control the amplification of said analog read signal during said read operation and the amplification of said analog write signal during said write operation.

5. An interface circuit for use in a storage device, comprising:
   an amplifier circuit operable to amplify an analog read or write signal during a read or write operation, respectively;
   a channel circuit coupled to said amplifier circuit and operable to convert a digital write signal to said analog write signal and said analog read signal to a digital read signal during said write and read operation, respectively;
   a control circuit operable to control said read and write operations, and to control said channel circuit with control information, said control circuit further operable to provide said digital write signal to said channel circuit and to receive said digital read signal from said channel circuit during said write and read operations, respectively;
   a bus coupled between said channel circuit and said control circuit, said bus including at least one control line and a plurality of data lines, wherein when said at least one control line indicates an active state, said plurality of data lines are used to transmit said digital read and write signals, and when said at least one control line indicates an inactive state, said plurality of data lines are used to transmit said control information.

6. The interface circuit of claim 5, wherein said control circuit includes a hard disk controller and a microprocessor unit integrated together and housed within a single package.

7. The interface circuit device of claim 5, wherein said channel circuit is operable to control said amplifier circuit in response to said control information from said control circuit.

8. The interface circuit device of claim 5, wherein said control information transmitted to said channel circuit is accessed by said channel circuit at predetermined bus-cycle intervals.

9. A storage device, comprising:

at least one storage medium;

a head assembly operable to communicate with said at least one storage medium, said head assembly having at least one head operable to provide an analog read signal during a read operation, or to receive an analog write signal during a write operation;

an amplifier circuit coupled to said head assembly, said amplifier circuit operable to amplify said analog read signal during a read operation, or to amplify said analog write signal during a write operation;

a channel circuit coupled to said amplifier circuit and operable to convert a digital write signal to said analog write signal during said write operation, or to convert said analog read signal to a digital read signal during said read operation;

a control circuit operable to control said read and write operations, and to control said channel circuit with control information, said control circuit also operable to provide said digital write signal to said channel circuit during said write operation and to receive said digital read signal from said channel circuit during said read operation;

a bus coupled between said channel circuit and said control circuit, said bus including at least one control line and a plurality of data lines, wherein when said at least one control line indicates an active state, said plurality of data lines are used to transmit said digital read and write signals, and when said at least one control line indicates an inactive state, said plurality of data lines are used to transmit said control information.

10. The storage device of claim 9, wherein said control circuit includes a hard disk controller and a microprocessor unit integrated together and housed within a single package.

11. The storage device of claim 9, wherein said channel circuit is operable to control said amplifier circuit in response to said control information from said control circuit.

12. The storage device of claim 9, wherein said control information transmitted to said channel circuit is accessed by said channel circuit at predetermined bus-cycle intervals.

13. A method of controlling read and write operations in a storage device, comprising the steps of:

(a) providing a control signal having either a first state or a second state;

(b) providing read data to a data bus or receiving write data from said data bus when said control signal is at said first state, wherein said data bus is coupled between a control device and a channel circuit; and (c) providing control information to said data bus when said control signal is at said second state.

14. The method of claim 13, herein step (a) comprises the steps of:

(i) providing said control signal having said first state when performing said read or write operation; and (ii) providing said control signal having said second state when not performing said read or write operation.

* * * * *